(12) United States Patent
Krikorian et al.

(10) Patent No.: US 7,728,756 B2
(45) Date of Patent: Jun. 1, 2010

(54) WIDE AREA HIGH RESOLUTION SAR FROM A MOVING AND HOVERING HELICOPTER

(75) Inventors: Kapriel V. Krikorian, Calabasas, CA (US); Robert A. Rosen, Agora Hills, CA (US); Michael Gubala, Laguna Niguel, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/894,069

(22) Filed: Aug. 20, 2007

(65) Prior Publication Data

US 2009/0051585 A1    Feb. 26, 2009

(51) Int. Cl.
*G01S 13/90* (2006.01)
*H01Q 15/14* (2006.01)

(52) U.S. Cl. .................. 342/25 A; 342/25 R; 342/5

(58) Field of Classification Search ............... 342/25 R, 342/25 A–25 F, 5–6, 61–65
See application file for complete search history.

(56) References Cited

U.S. PATENT DOCUMENTS

| | | | | |
|---|---|---|---|---|
| 3,787,862 A | * | 1/1974 | Jacobson | 342/418 |
| 6,054,947 A | * | 4/2000 | Kosowsky | 342/191 |
| 6,509,862 B2 | * | 1/2003 | Klausing et al. | 342/25 R |
| 6,542,110 B1 | * | 4/2003 | Lohner et al. | 342/25 R |
| 6,914,554 B1 | * | 7/2005 | Riley et al. | 342/58 |
| 6,925,382 B2 | * | 8/2005 | Lahn | 701/223 |
| 7,528,762 B2 | * | 5/2009 | Cerwin | 342/22 |

FOREIGN PATENT DOCUMENTS

JP    60170777 A   *  9/1985

* cited by examiner

*Primary Examiner*—Thomas H Tarcza
*Assistant Examiner*—Cassi Galt
(74) *Attorney, Agent, or Firm*—Pillsbury Winthrop Shaw Pittman LLP

(57) ABSTRACT

A hovering helicopter has a radar transmitter/receiver for transmitting radar pulses for illuminating a target for SAR imaging, and rotor blades for generating lift. Radar reflectors are on the rotor blades. The radar reflectors are oriented to reflect the radar pulses from the transmitter to the target as the rotor blades rotate. The radar pulses reflected by the moving reflector from the transmitter are timed to generate the synthetic aperture image using radar returns from the target. The receiver also receives blade returns directly reflected from the moving reflectors attached to the lift rotor blades. The receiver analyzes the blade returns to extract motion details of the reflectors and uses the motion details for motion compensation of target returns for SAR imaging.

42 Claims, 7 Drawing Sheets

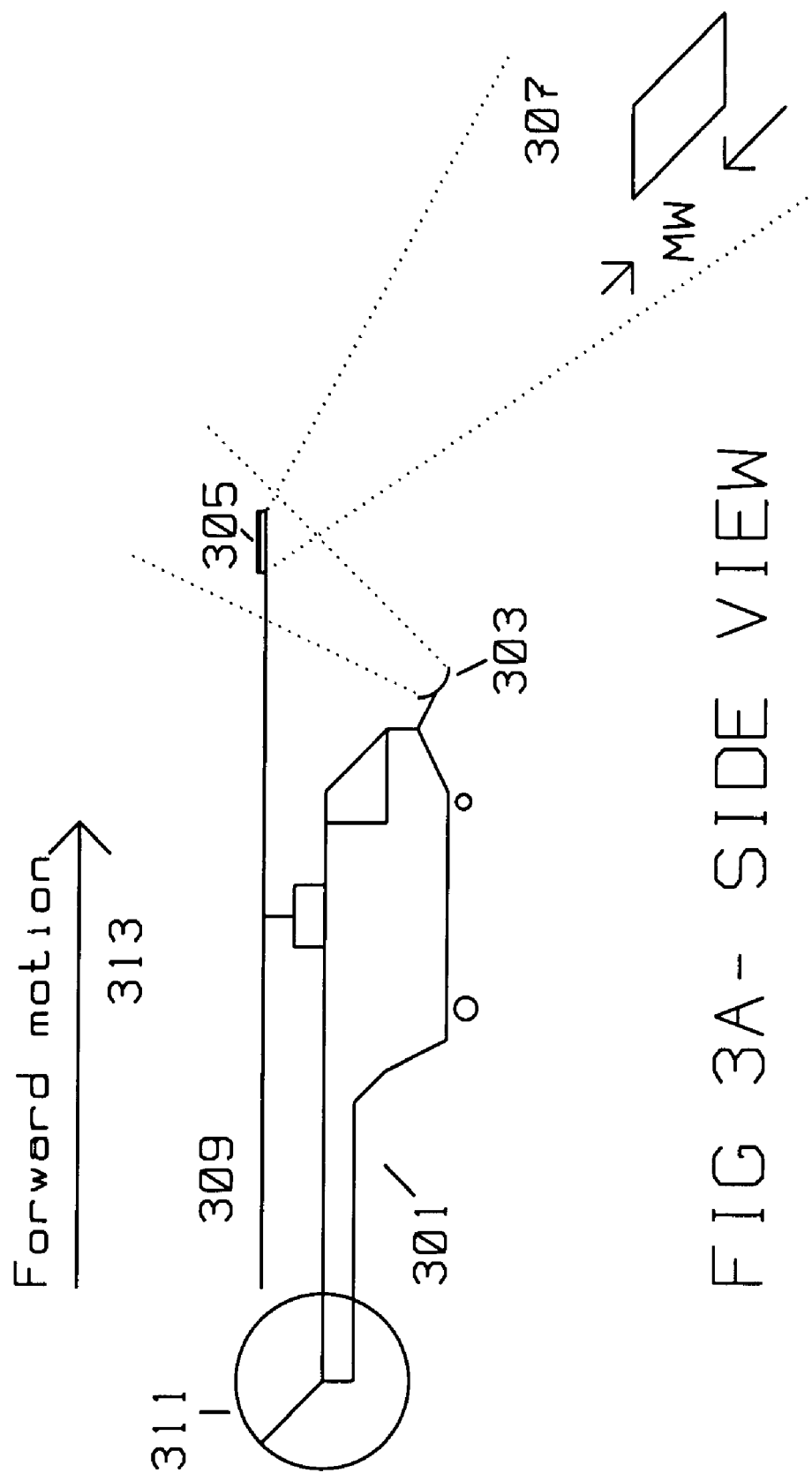

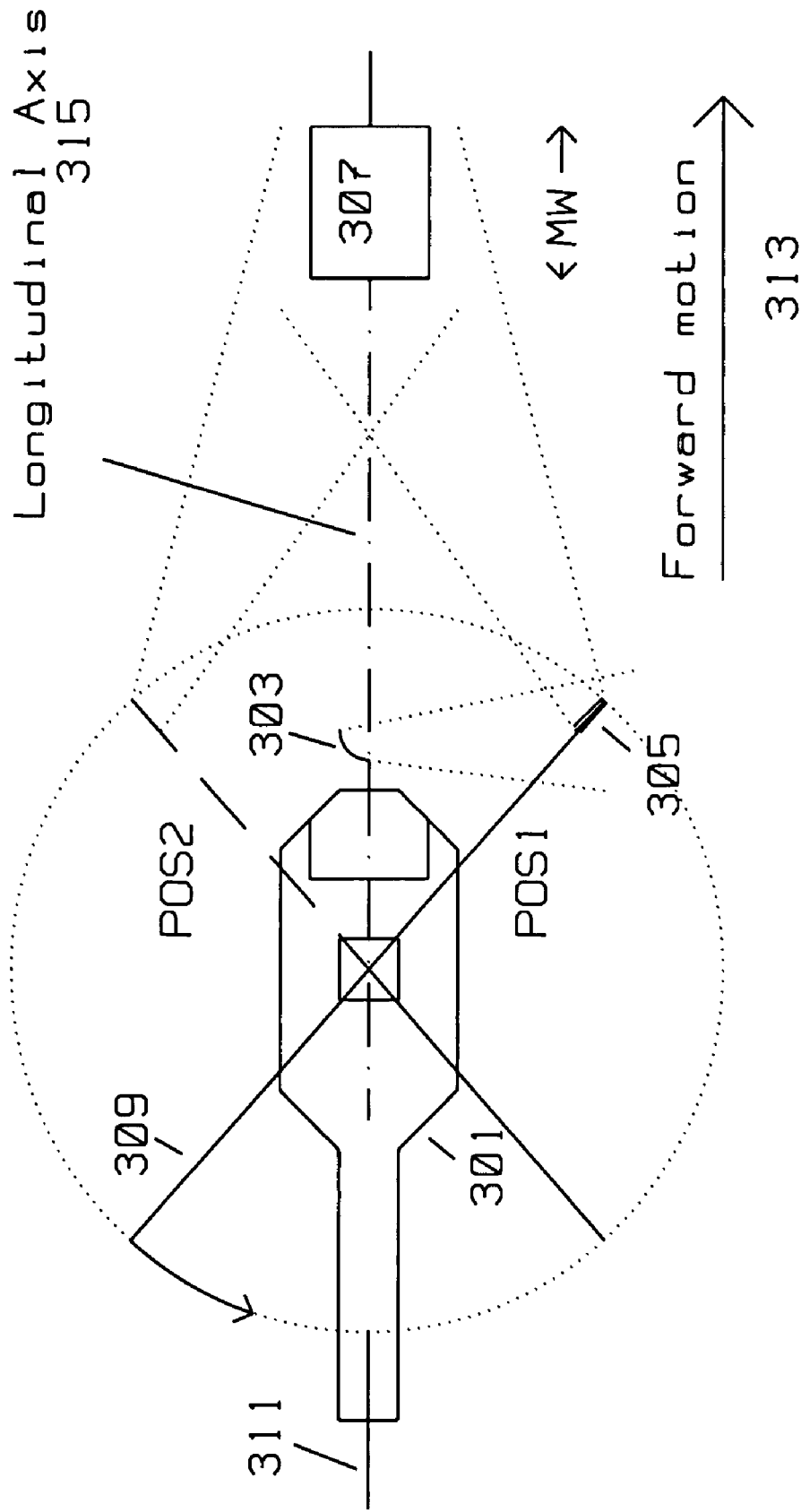
FIG 3B - TOP VIEW

WIDE AREA HIGH RESOLUTION SAR FROM A MOVING AND HOVERING HELICOPTER

BACKGROUND OF THE INVENTION

1. Field of Invention

This disclosure is in the field of Synthetic Aperture Radar (SAR) and imaging obtained from a stationary or moving platform where platform motion is not required for SAR imaging.

2. Description of the Related Art

Synthetic Aperture Radar (SAR) is used for ground mapping as well as target identification. A general principle behind SAR is to coherently combine the amplitude and phase information of radar returns from a plurality of sequentially transmitted pulses. These pulses are from a relatively small antenna on a forward moving platform. As the platform moves, the information contained in the radar returns acquired at different positions is coherently combined to arrive at a SAR image. An increase in resolution of SAR, as compared to a stationary antenna of the same size, comes from the forward motion of the SAR antenna and collection of multiple returns along the path covered by the SAR antenna. The SAR image is typically side looking. That is, the path of the moving platform is not toward the location of the SAR image, but rather tangential to it.

As is well known in the art, the plurality of returns creating a SAR image generated by the transmitted pulses along a forward path of the platform make up an array. During the array, amplitude as well as phase information returned from each of the radar returns, for each of many range bins, is preserved. That is, the SAR image is formed from the coherent combination of the amplitude and phase of radar return(s) within each range bin, motion compensated for forward spatial displacement of the moving platform during the acquisition of the returns for the duration of the array.

Motion compensation for platform movement is a necessity of SAR. Motion compensation for spatial displacement, or forward motion of the platform, shifts the phase of each radar return (typically an I+jQ complex quantity derived from an analog to digital converter) in accordance with the motion of the moving antenna with respect to a reference point. The SAR imaging process depends on the coherent, phase accurate summing of all radar returns expected within an array. These principles are detailed in the prior art as exemplified by W. G. Carrara, R. S. Goodman and R. M. Majewski in *Spotlight Synthetic Radar*, Boston, Artech House, 1995, incorporated herein in its entirety by reference.

In one solution to motion compensation, as an approximation, the plurality of returns creating a SAR image from different platform positions are assumed to be acquired along a presumed known, planar and rectilinear path of the platform to make up an array. If the SAR platform follows the proper path, during the array, amplitude as well as phase information returned from each of the pulses, for each of many range bins, is preserved. Motion compensation of target returns is critical to SAR imaging. The clarity of details of a SAR image is dependent on the accuracy of the motion compensation applied to each radar return prior to SAR image computation as well as relative position of the platform with respect to the ideal path required for SAR image acquisition. The SAR imaging process depends on the coherent, phase accurate summing of the sequence of all radar returns expected within an array, typically accurate to better than ¼ wavelength. Accelerometers coupled to an inertial navigation system (INS) are typical prior art approaches to determining the position in space of the transmit/receive radar antenna phase center.

The essential aspect of motion compensation to SAR and its inherent inaccuracies and complexities have brought imaginative solutions. Where a non-ideal platform motion exists, having forward flight path deviations away from a rectilinear, planar path, motion compensation (INS based) of the pulses may not fully compensate for phase errors. Consequently, the coherent summing of radar returns over an array will also be inaccurate. The resulting phase error over the array blurs the SAR image, reducing its utility. Where INS based motion compensation is insufficient, one solution is autofocus. Autofocus is applied where the accuracy of the INS derived motion compensation phase compensation applied to each radar A/D sample is insufficient. Autofocus (AF) methods typically use information contained in the radar returns of the SAR data itself in an attempt to phase align radar return samples to accuracies better than those available from INS motion compensation alone. Estimated phase error derived from collected SAR data is applied to the motion compensated SAR data to improve the resulting SAR image.

Another problem in the prior art is that SAR is side looking. That is, the SAR platform is required to have a component of motion tangential to the target to generate a SAR image. Without platform motion, the principles of SAR cannot be applied. Thus, in the prior art, the SAR platform is precluded from loitering in one, hovering position. For example, a helicopter could not vertically peek over a hill to acquire a SAR image, as it would have to move forward, as explained above. In the prior art, during the acquisition of a SAR image, the helicopter is denied the safety of a hill to shield it from enemy fire because of the required tangential motion.

Tangential motion presents yet another problem of prior art SAR. SAR acquires an image towards the side, at an angle, to the forward motion vector of the platform. This typically precludes using SAR for imaging a landing site or target where the landing site or target is directly ahead, aligned with the longitudinal axis of the platform. Thus, in the prior art, SAR radar cannot be efficiently used for radar imaged terrain following, or landing site imaging as the SAR image presented is not in front of the path of the platform, but rather to the side.

As detailed above, prior art SAR has imposed two major constraints that limit its utility. The first is the need for transmit/receive motion of the SAR platform to complete a SAR image and complexities of motion compensation. The second is the side looking limitation, precluding mapping directly ahead of the flight path.

SUMMARY OF THE INVENTION

Above limitations of the SAR process are avoided by a hovering (stationary) or moving helicopter equipped with a radar system for acquiring a synthetic aperture image of a target. The helicopter has a radar transmitter for transmitting radar pulses for illuminating the target, and one or more rotor blades for generating lift for the helicopter. One or more radar reflectors are on the rotor blades. The radar reflectors are oriented to reflect the radar pulses from the transmitter to the target. The radar reflectors reflect the radar pulses from the transmitter to the target as the rotor blades rotate. The radar pulses reflected by the moving reflector from the transmitter are timed to generate the synthetic aperture image using radar returns from the target.

A radar receiver is co-located with the transmitter on the helicopter, or remotely located (bistatic radar), for receiving target radar returns from the target with radar pulses reflected from the transmitter. The receiver also receives blade returns directly reflected from one or more of the moving reflectors attached to the lift rotor blades. The receiver analyzes the blade returns to motion compensate the target returns for motion of the reflector. The one or more reflectors also reflect the radar returns from the target into the receiver. The reflectors are mechanically coupled, or part of the one or more rotor blades.

BRIEF DESCRIPTION OF THE DRAWING

In the Drawing:
FIG. 3A is a side view of the geometry used in this disclosure;
FIG. 3B is a top view of the geometry used in this disclosure.

DETAILED DESCRIPTION

This disclosure introduces the concept of using a moving blade reflector rotatingly attached to a stationary platform to generate a forward looking SAR image. The radar return motion compensation is derived from the direct reflections off the moving, blade reflector itself, simplifying motion compensation computations. Typically, the moving blade reflector is attached to the main lift rotor blade(s) of a helicopter.

Figure 1:
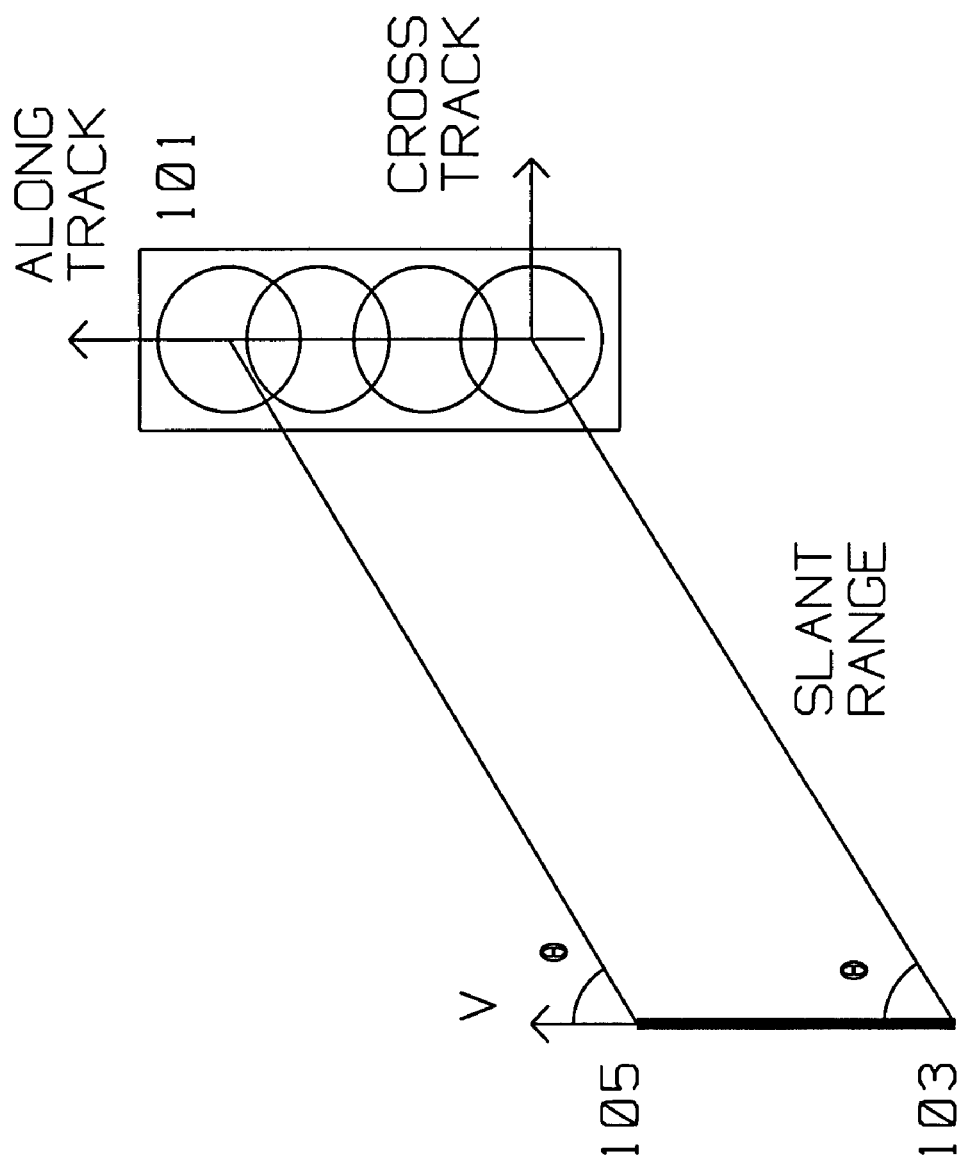
FIG. 1 is a SAR swath configuration of the prior art

FIG. 1 shows the typical prior art geometric relationship between a moving platform carrying a radar transmitter/receiver using Synthetic Aperture (SAR) search methods imaging target 101 by said radar transmitter/receiver in a swath mode. The moving platform is initially at position 103, travels with velocity V in the direction shown to position 105. In SAR search (or swath) mode, the SAR antenna azimuth is fixed at azimuth angle θ oriented towards target 101 as the platform moves with velocity V. The moving platform moves from position 103 to position 105, while maintaining a fixed angle θ to the velocity vector (side looking, tangential component of velocity to target is required) so that the antenna illuminates portions of target 101 as it progresses. Radar pulses are transmitted and corresponding returns received at many points during the arrays collected between position 103 and position 105. The swath search types of SAR radar are well known in the art and are described, for example, by J. C. Curlander, et al, in *Synthetic Aperture Radar: Systems and Processing*, Wiley, 1991, incorporated herein be reference in its entirety.

Figure 2:
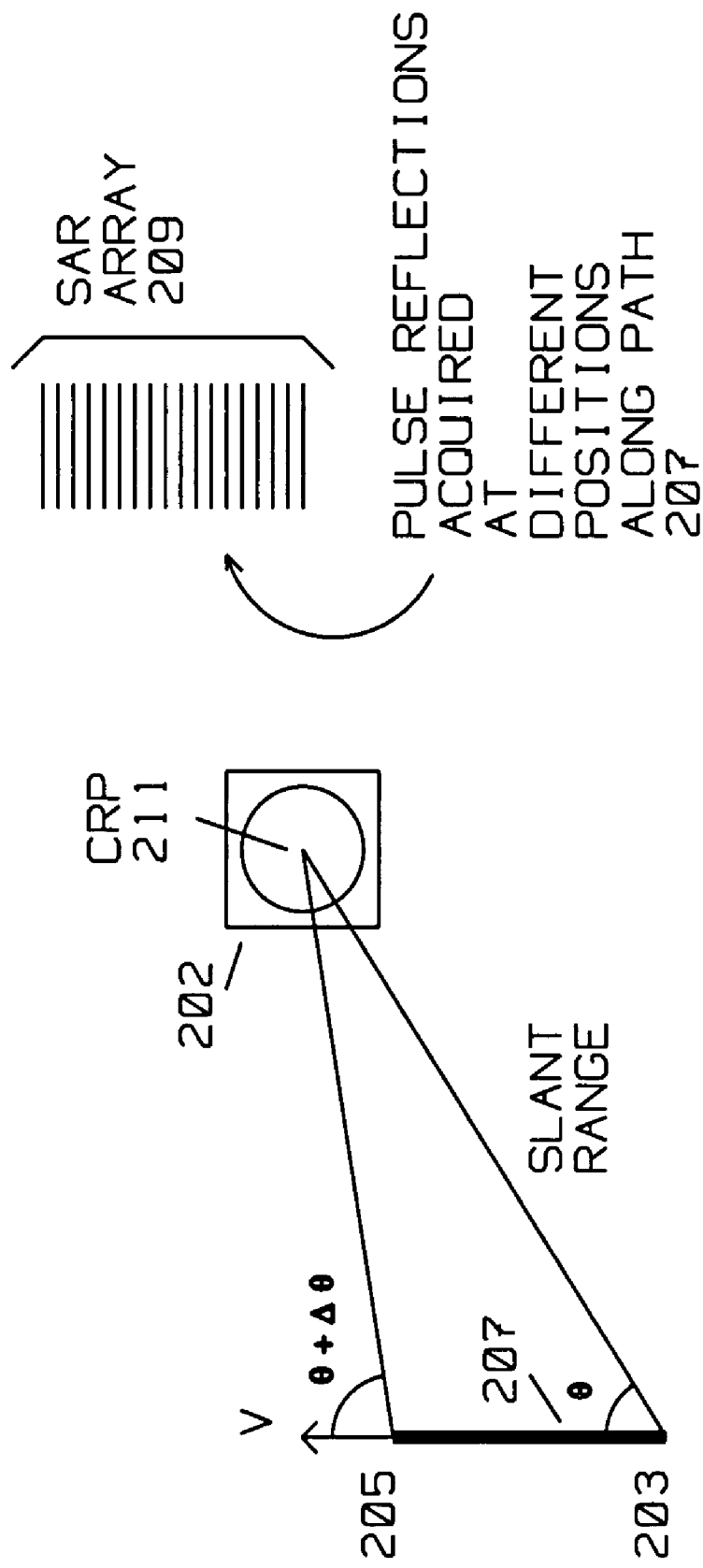
FIG. 2 is SAR spot configuration of the prior art.

As an alternative to swath mode SAR in FIG. 1, FIG. 2 shows the typical prior art geometric relationship between a moving platform carrying a radar transmitter and receiver using Synthetic Aperture (SAR) spot search methods imaging target 202 by a radar transmitter/receiver. The moving platform is initially at position 203, travels along a rectilinear path 207 with velocity V to position 205. In SAR spot mode, the SAR antenna azimuth is oriented towards ground target 202, having a variable azimuth angle θ to θ+Δθ, θ changing as the platform moves with velocity V. The moving platform moves from position 203 to position 205 along path 207, so that the antenna illuminates target 202 with respect to a motion compensation reference point, the Central Reference Point (CRP) 211. Radar pulses are transmitted and corresponding returns received at many points during SAR array 209 collected between position 203 and position 205. Typically, a complete SAR array 209 has $2^n$ pulse returns such as 256, 512, 1024, 2048, for compatibility with subsequent FFTs used for SAR image formation. A typical SAR array 209 requires each of its reflected pulse information to be motion compensated for platform motion with respect to CRP 211.

The prior art referenced in FIG. 1 and FIG. 2 have a key requirement in common: the need for motion, a tangential velocity component of the SAR platform with respect to target 202. Because of the change in relative position of the SAR platform from pulse to pulse within an array, the reflected returns require motion compensation to facilitate in phase combination of the returns. Motion compensation is the process of digital correction of radar phase error for each radar return in a SAR frame forming a SAR image due to the change in position of scatterers relative to the moving platform as it acquires radar returns. The motion of the moving platform with respect to a focus point CRP 211, is typically measured using accelerometers coupled to GPS/INS systems. Motion compensation is performed in an airborne digital computer (processor) on each I/Q sample of a radar return. The exact form of motion compensation depends on the method used to compile the SAR image from the radar returns. Residual phase error is the phase error present after motion compensation has been taken into account. Residual phase error from various sources, such as uncompensated sensor motion or atmospheric effects, results in degraded SAR image quality.

The actual implementation of motion compensation for a typical SAR platform is relatively complex and presents a substantial computational burden. Other challenges need to be considered. For example, the actual flight path of the moving platform typically deviates from the ideal, assumed straight line path, such as between positions 203 and 205. Because of this deviation from the theoretical path, the image quality for targets located some distance from the (image) CRP degrades. Image degradation due to flight path deviation (FPD), also referred to as non-planar motion (NPR), is a common phenomenon requiring a relatively complex solution. One approach to minimize image degradation is to use range re-sampling based on the cosine of grazing angles at the CRP computed from the difference between the ideal and actual flight path.

From a tactical point of view, the requirement for relative motion, that is the velocity V in prior art FIG. 1 and FIG. 2, precludes a hovering, stationary platform from delivering SAR images. This presents an obstacle for SAR imaging using hovering, relatively stationary platforms, such as helicopters, tethered balloons, dirigibles and/or other lighter than air ships.

Figure 3C:
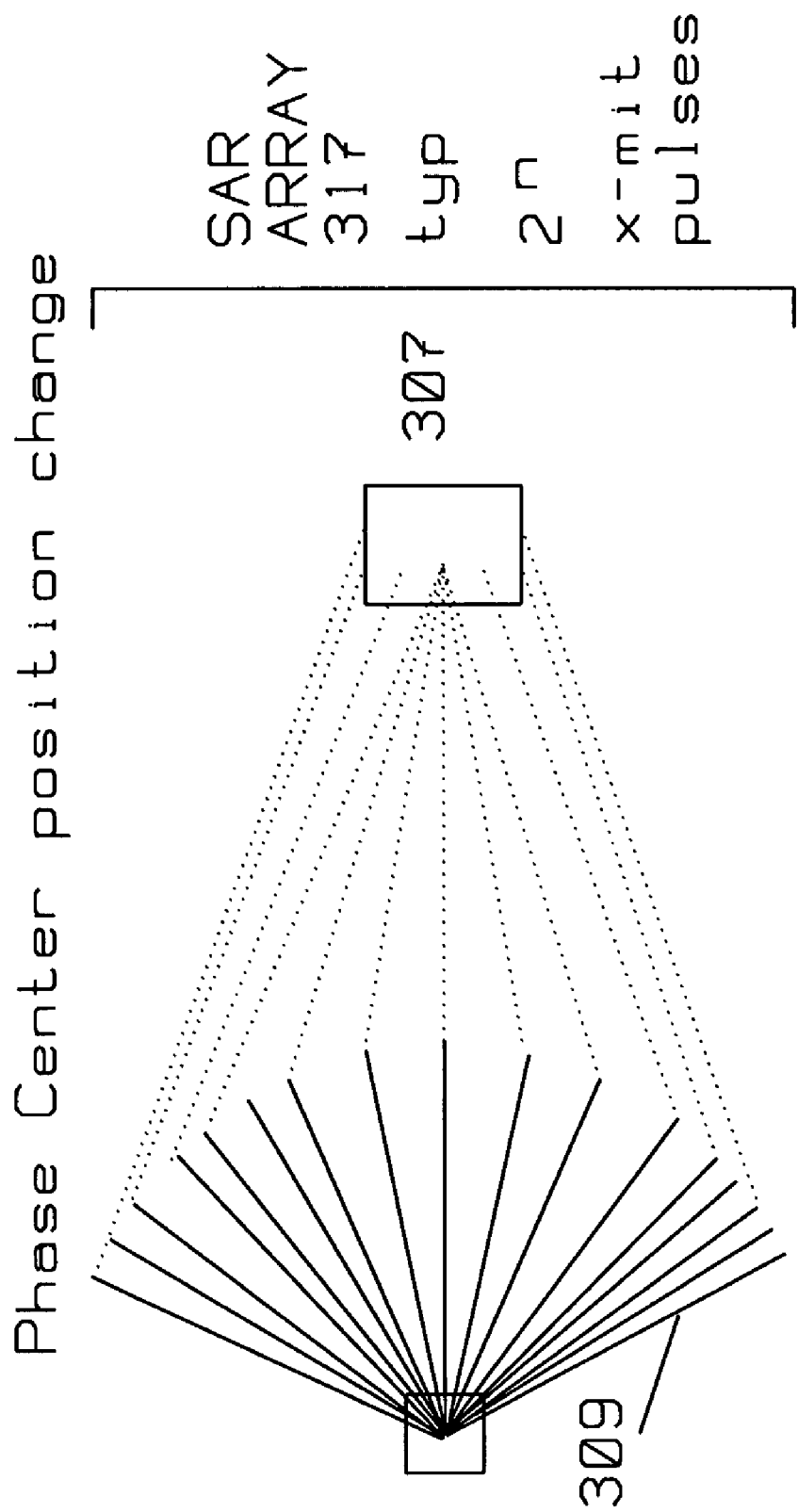
FIG. 3C is a top view of the SAR moving phase center(s) used in this disclosure for SAR imaging.

The limitations of the prior art are avoided by a configuration shown in FIGS. 3A, 3B and 3C. FIG. 3A shows a side view of the geometry used in the present disclosure. Transmitter/Receiver 303 illuminates blade reflector 305 mounted on moving blade 309. Moving blade 309 is part of a hovering helicopter 301. In one mode of operation, during hovering of helicopter 301, Forward Motion 313 is zero. However, the principles herein are also applicable when Forward Motion 313 is non-zero, as the SAR required imaging phase center movement is determined by moving blade 309 rotation, not helicopter 301 (platform) motion. Blade reflector 305 reflects radar pulse energy from transmitter/receiver 303 onto target 307. Transmitter/receiver (RX/TX) 303 is optimally located near the rotor hub powering blade 309. Target returns, reflected by target 307, are reflected by blade reflector 305 into the receiver portion of receiver/transmitter 303. Rotor 311 applies counter-torque to allow blade 309 to turn with respect to helicopter 301 while supplying lift during hovering. With radar operation, for example, at 95 Ghz, reflector 305 is made of 3 mm ridges, part of the structure of helicopter blade 309. When not hovering, moving forward, helicopter 301 has forward motion 313 in the direction shown towards target 307. Target 307 has map width MW along the range direction to reflector 305.

FIG. 3B provides a side view of the geometry shown in FIG. 3A. Helicopter rotating (moving) blade 309 is shown in two positions POS1 and POS2 along its rotary motion. In POS1, the first position of blade 309, blade reflector 305 illuminates target 307 with radar pulses from receiver transmitter 303. A quarter revolution of blade 309 later, at POS2, the same blade reflector 305 illuminates the same target 307 from a location different than POS1. The changing of position of reflector 305 with time because of the rotation of blade 309 illuminates target 307 from a multitude of positions, while also receiving target returns. This change in position of blade reflector 305 induces a moving phase center allowing SAR image formation when helicopter 301 is hovering, or stationary. The same principle applies when helicopter 301 has forward motion 313 along its longitudinal axis 315 directly towards target 307. Target 307 is aligned with the longitudinal axis 315 of helicopter 301 having forward motion 313. The principles herein allow imaging of target 307 when target 307 is located to the sides of the longitudinal axis 315, as well as directly in front of helicopter 301.

FIG. 3C shows a top view example of how an array 317 of SAR data is collected during approximately a ⅓ revolution of blade 309 with reflector 305 attached. Typically, the pulse rate of receiver/transmitter 303 is adjusted to collect an array of 256, 512, 1024 or other $2^n$ number of radar returns during the ⅓ revolution. Generally, a phased array antenna (electronically scanned antenna), part of receiver/transmitter 303, is used to electronically steer the radar transmit/receive beam as blade 309 moves in its circular motion. The peak of the beam, emanating from the antenna, illuminates reflector 305. Reflector 305 in turn illuminates target 307. Less than a ⅓ revolution, or more, may be used depending on the steering angle available from the phased array antenna of receiver/transmitter 303. It should be understood that reflector 305 will also reflect energy back directly to RX/TX 303 from the original transmit pulse. This direct reflection is used to determine the position of reflector 305 for motion compensation purposes, as discussed with respect to FIG. 4. If various constraints preclude the use of a phased array antenna, a fixed antenna illuminating a portion of the arc traversed by reflector 305 on blade 309 can also be used. As the reflector moves along, the principles of FIG. 3C still apply, but over a narrower, perhaps ⅙ of a revolution of blade 309.

Figure 4:
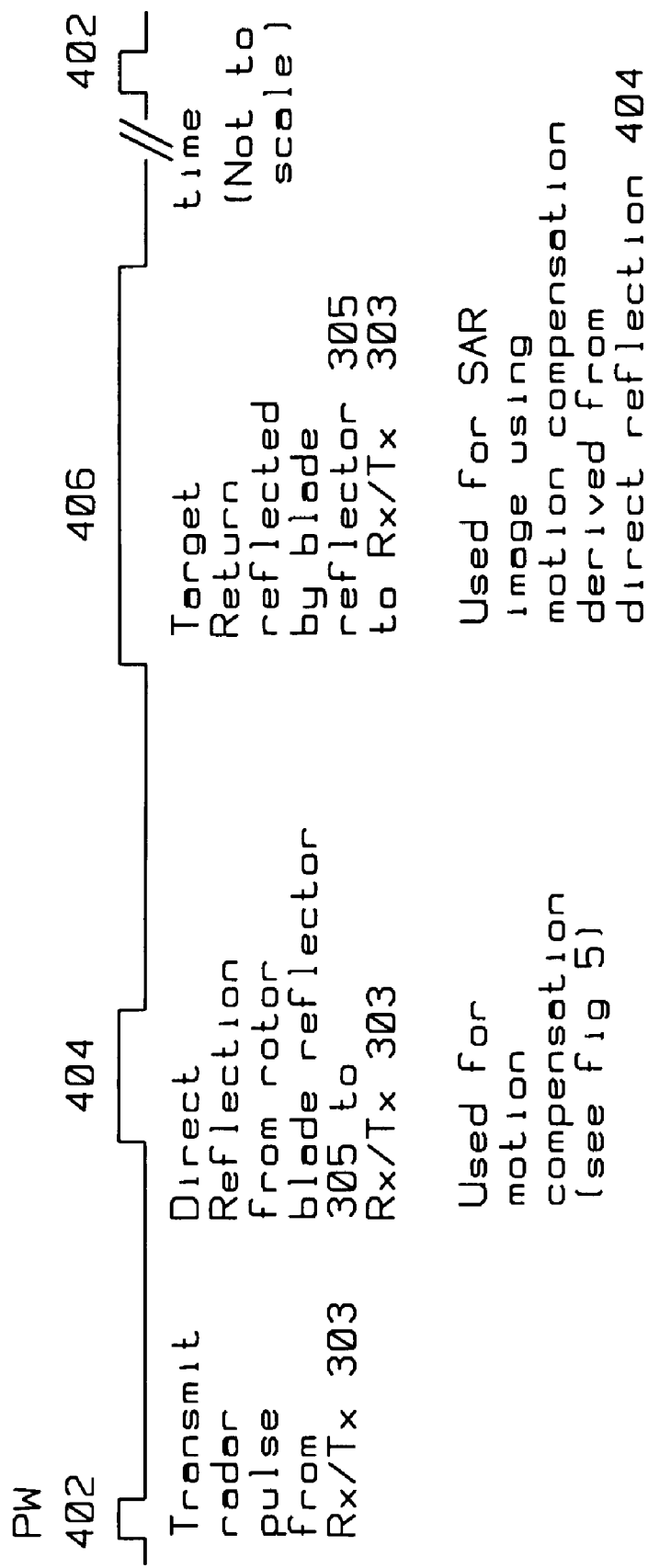
FIG. 4 is a sample waveform detailing radar pulse timing for this disclosure.

FIG. 4 shows the sequence of the pulses transmitted and received from/to receiver/transmitter 303. Transmit Radar Pulse 402 is typically a short pulse, 26 nanoseconds, 13:1 pulse compression. A medium PRF in the order of 30 Khz is used. The energy from pulse 402 is reflected off blade reflector 305 to the receiver of receiver/transmitter (RX/TX) 303. The delay of direct reflection 404 from blade reflector 305 is used to determine the position of blade reflector 305 with respect to RX/TX 303. The position of blade reflector 305, located between RX/TX 303 and target 307, determines the moving phase center of returns from target 307 for SAR processing purposes. For motion compensation purposes of the returns from target 307, the distance to reflector 305 is computed from direct reflections 404. Target returns 406 arrive after direct reflections 404, as target 307 is farther away from RX/TX 303. It is the content of target returns 406 that is processed for the SAR image.

If the width of the pulse 402 is PW, then:

a) The width of direct reflections 404 is PW+RBL where RBL is the Reflective blade length of reflector 305.

b) The width of target return pulse 406 is MW+2*(PW+RBL) where MW is the target 307 (map) width along the range direction.

For higher power operation a relatively long Frequency Modulated Continuous Wave (FMCW) chirp is transmitted. This frequency modulated pulse allows concurrent transmission as well as reflected radar signal reception because the transmitted signal is at a different frequency along the chirp as compared to the received signal for relevant target ranges. Transmitted Power requirements are in the order of 1 watt.

Figure 5:
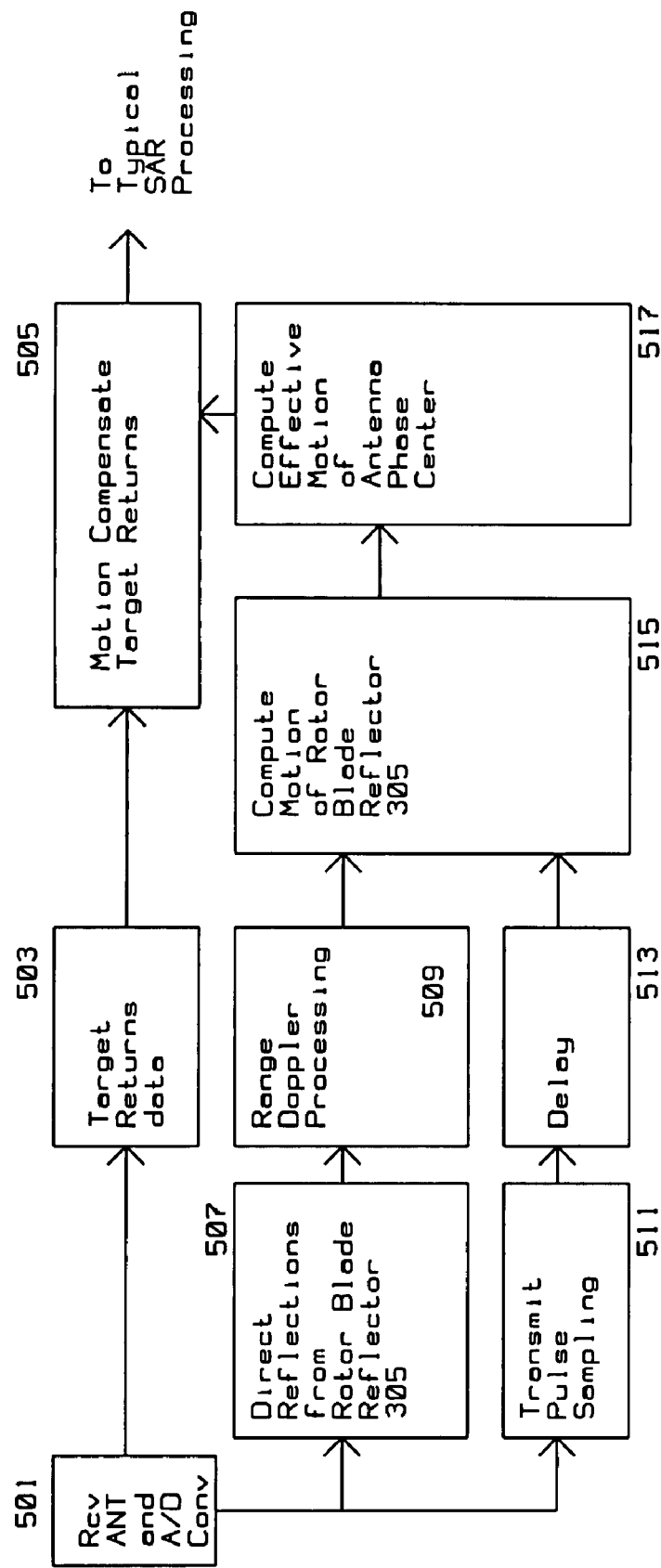
FIG. 5 is the digital processing used for this disclosure.

FIG. 5 shows the method used in the processing of radar returns for this disclosure. Receiver antenna and A/D converter 501 generate digital representations of Target Returns Data 503 as well as Direct Reflections 507. Target Returns Data 503 is generated during the interval 406 identified and discussed in FIG. 4. Direct Reflections 507 is generated during the interval 404 identified and discussed in FIG. 4. The results from 507, Direct Reflections from Rotor Blade Reflector 305 are analyzed in Range Doppler processing 509 to identify position and motion parameters of rotor blade reflector 305. This may be enhanced by mechanical position inputs from the helicopter rotor drive system for blade 309.

Transmit pulse sampling 511 identifies the start time of the transmit pulse along with other parameters. Delay 513 stored these parameters until they are used in conjunction with results from Doppler Processing 509 by 515, Compute Motion of Rotor Blade Reflector 305.

The output of 515 is used in Compute Effective Antenna Phase Center 517 to provide the phase information on a range bin by range bin basis to be used by Motion Compensate Target Returns 505 to motion compensate the digital data emerging from Target Returns data 503. The motion compensated data is now ready for typical SAR processing.

SUMMARY

The above describes a radar system for acquiring a synthetic aperture image of a target 307 from a stationary platform, such as helicopter 301, unlike a prior art moving platform. The radar system comprises a radar transmitter (part of RX/TX 303) on the stationary platform for transmitting radar pulses 402 used for illuminating the target 307. A moving reflector 305 in the proximity of, and coupled to the stationary platform (helicopter 301), moves relative to the stationary platform (helicopter 301) and the target 307 along a path. The reflector 305 reflects the radar pulses from the transmitter (part of RX/TX 303) to the target 307 as it moves along the path. The relative motion of the reflector 305 achieves a moving phase center required for SAR imaging while the platform (helicopter 301) is stationary. The radar pulses reflected by the moving reflector 305 from said transmitter (par of RX/TX 303) are timed to generate the synthetic aperture image from radar returns from the target 307.

A receiver, part of RX/TX 303, or separately located from the transmitter, receives target returns from illuminating the target with radar pulses reflected from the transmitter. In addition, the same receiver receives blade returns from the moving reflector 305. The blade returns are reflected from the moving reflector directly into the receiver. The receiver analyzes the blade returns to extract blade position information to motion compensate the target returns for motion of the moving reflector. The reflector 305 also reflects radar returns from the target 307 into said receiver, part of RX/TX 303.

The platform, such as helicopter 301, need not be stationary. A helicopter 301 for acquiring a synthetic aperture image of a target 307 has a longitudinal axis 315, and moves with forward motion 313 along said longitudinal axis 315. Target 307 is aligned in space with said forward motion 313 along said longitudinal axis 315. The hardware and operation remains the same as for the case of the stationary platform. Radar pulses 402 are timed to generate the synthetic aperture image from target returns 406 from target 307. A SAR image is made of target 307, where target 307 is aligned with forward motion 313 along said longitudinal axis 315 of said helicopter 301.

In one embodiment, the path of the moving reflector is circular, centered along an axis, as is the case with a helicopter main lift rotor blade.

In another embodiment, the path of the moving reflector is elliptical or rectilinear, as is the case with lighter than air ships, tethered balloons or the like where a lift rotor blade does not exist. Some other form of mechanical reflector motion inducing device is envisioned.

All references cited in this document are incorporated herein in their entirety.

Although presented in exemplary fashion employing specific embodiments, the disclosed structures are not intended to be so limited. For example, while reflector 305 has been shown attached to, or part of a helicopter blade 309 following a circular path, reflector 305 could also follow a rectilinear or elliptical path controlled by a boom with a sliding connection for said reflector 305. Such a configuration is applicable for slow moving/stationary platforms not having a rotor blade 309, such as dirigibles, balloons and other lighter than air ships. In all cases, the motion of the radar platform itself is not used for moving the phase center of receiving/transmitting antenna for creating the SAR image.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

The invention claimed is:

1. A radar system configured to acquire a synthetic aperture image of a target, said radar system comprising:
    a radar transmitter affixed to a hovering platform that transmits radar pulses;
    a reflector moving relative to said hovering platform, said radar transmitter, and said target along a path, said reflector reflecting said radar pulses from said transmitter to said target as said reflector moves along said path, said radar pulses timed to generate said synthetic aperture image from radar returns from said target,
    wherein said synthetic aperture image is generated from said radar returns without any relative motion between said hovering platform and said target.

2. A radar system as described in claim 1 further comprising a receiver for target returns received from illuminating said target with radar pulses reflected from said transmitter.

3. A radar system as described in claim 2 wherein said receiver receives blade returns from said reflector.

4. A radar system as described in claim 3 wherein said receiver analyzes said blade returns to motion compensate said target returns for motion of said reflector.

5. A radar system as described in claim 2 wherein said reflector reflects said radar returns from said target into said receiver.

6. A radar system as described in claim 1 wherein said reflector is mechanically coupled to said hovering platform.

7. A radar system as described in claim 1 wherein said path of said reflector is circular.

8. A radar system as described in claim 1 wherein said path of said reflector is elliptical.

9. A radar system as described in claim 1 wherein said path of said reflector is rectilinear.

10. A helicopter configured to acquire a synthetic aperture image of a target, said helicopter comprising:
    a transmitter fixed to a body of said helicopter configured to transmit radar pulses that illuminate said target;
    rotor blades, said rotor blades rotating with respect to said body and said transmitter so as to generate lift for said helicopter; and
    one or more reflectors on said rotor blades, said one or more reflectors oriented to reflect said radar pulses from said transmitter to said target;
    wherein said radar pulses are timed to generate said synthetic aperture image from radar returns from said target.

11. A helicopter as described in claim 10, further comprising a receiver configured to receive target returns reflected by illuminating said target with radar pulses transmitted by said transmitter.

12. A helicopter as described in claim 11 wherein said receiver receives blade returns from said one or more reflectors.

13. A helicopter as described in claim 12 wherein said receiver analyzes said blade returns to motion compensate said target returns for motion of said one or more reflectors.

14. A helicopter as described in claim 12 wherein said one or more reflectors reflect said radar target returns from said target into said receiver.

15. A helicopter as described in claim 10 wherein said one or more reflectors are mechanically coupled to said rotor blades.

16. A method configured to acquire a synthetic aperture image of a target using a radar system, the method comprising:
    transmitting radar pulses from a radar transmitter affixed to a non-rotating section of a hovering platform;
    illuminating a moving reflector with said radar pulses, said moving reflector moving along a path, said moving reflector reflecting said radar pulses from said transmitter to said target as said moving reflector moves along said path, said radar pulses timed to generate said synthetic aperture image from target returns from said target,
    wherein said synthetic aperture image is generated from said radar returns without relative movement between said hovering platform and said target.

17. A method as described in claim 16 further comprising receiving target returns from illuminating said target with radar pulses reflected by said moving reflector.

18. A method as described in claim 17 wherein said receiver receives blade returns reflected from said moving reflector.

19. A method as described in claim 18 wherein said receiver analyzes said blade returns to motion compensate said target returns for motion of said reflector.

20. A method as described in claim 17 wherein said reflector reflects said target returns from said target into said receiver.

21. A method as described in claim 16, wherein said moving reflector is mechanically coupled to said hovering platform.

22. A method as described in claim 16 wherein said path of said moving reflector is circular.

23. A method as described in claim 16 wherein said path of said moving reflector is elliptical.

24. A method as described in claim 16 wherein said path of said moving reflector is rectilinear.

25. A method of operating a hovering helicopter configured to acquire a synthetic aperture image of a target, the method comprising:
transmitting radar pulses from a transmitter fixed to a body of said hovering helicopter;
rotating rotor blades that generate lift for said helicopter;
illuminating one or more reflectors on said rotating rotor blades with said transmitted radar pulses, said one or more reflectors oriented to reflect said transmitted radar pulses from said transmitter to said target as said rotor blades rotate;
timing said transmitted radar pulses reflected by said one or more reflectors to generate said synthetic aperture image from target returns from said target.

26. A method as described in claim 25 further comprising receiving target returns using a receiver, said target returns received from illuminating said target with radar pulses reflected by said one or more reflectors.

27. A method as described in claim 26 wherein said receiver receives blade returns from said one or more reflectors.

28. A method as described in claim 27 wherein said receiver analyzes said blade returns to motion compensate said target returns for motion of said one or more reflectors.

29. A method as described in claim 27 wherein said one or more reflectors reflect said target returns from said target into said receiver.

30. A method as described in claim 25, wherein said one or more reflectors are mechanically coupled to said rotor blades.

31. A helicopter configured to acquire a synthetic aperture image of a target, said helicopter having a longitudinal axis, said helicopter moving with forward motion along said longitudinal axis, said target aligned with said forward motion along said longitudinal axis, said helicopter comprising:
a transmitter fixed to a body of said helicopter that transmits radar pulses that illuminate said target;
rotor blades that rotate to generate lift for said helicopter;
one or more reflectors on said rotor blades, said one or more reflectors oriented to reflect said radar pulses from said transmitter to said target, said radar pulses timed to generate said synthetic aperture image from target returns from said target,
wherein said target is aligned with said forward motion along said longitudinal axis of said helicopter while said synthetic aperture image is generated.

32. A helicopter as described in claim 31, further comprising a receiver configured to receive target returns received after illuminating said target with radar pulses reflected from said transmitter.

33. A helicopter as described in claim 32 wherein said receiver receives blade returns from said one or more reflectors.

34. A helicopter as described in claim 33 wherein said receiver analyzes said blade returns to motion compensate said target returns for motion of said one or more reflectors.

35. A helicopter as described in claim 32 wherein said one or more reflectors reflect said radar returns from said target into said receiver.

36. A helicopter as described in claim 31 wherein said one or more reflectors are mechanically coupled to said rotor blades.

37. A method for acquiring a synthetic aperture image of a target using a helicopter, said helicopter having a longitudinal axis, said helicopter moving with forward motion along said longitudinal axis, said target aligned with said forward motion along said longitudinal axis, said method comprising:
transmitting radar pulses from a body portion of said helicopter to illuminate said target;
rotating rotor blades of said helicopter to generate lift for said helicopter, said rotor blades equipped with one or more reflectors, said one or more reflectors oriented to reflect said radar pulses from said transmitter to said target;
timing said radar pulses from said transmitter to said target as said rotor blades rotate to generate said synthetic aperture image from radar returns received from said target.

38. A method as described in claim 37, further comprising a receiver configured to receive target returns received after illuminating said target with said radar pulses.

39. A method as described in claim 38 wherein said receiver receives blade returns from said one or more reflectors.

40. A method as described in claim 39 wherein said receiver analyzes said blade returns to motion compensate said target returns for motion of said one or more reflectors.

41. A method as described in claim 38 wherein said one or more reflectors reflect said radar returns from said target into said receiver.

42. A method as described in claim 38 wherein said one or more reflectors are mechanically coupled to said rotor blades.

* * * * *